March 18, 1969 SHOICHI SAITO 3,433,425

TAPE DRIVING DEVICE

Filed Nov. 3, 1966 Sheet 1 of 3

Shoichi Saito

INVENTOR.

BY Wenderoth, Lind and Ponack, Attorneys

*Shoichi Saito,*
INVENTOR.

BY *Wenderoth, Lind and Ponack,*
*Attorneys*

Shoichi Saito
INVENTOR.

BY Wenderoth, Lind and Ponack, Attorneys

United States Patent Office 3,433,425
Patented Mar. 18, 1969

3,433,425
TAPE DRIVING DEVICE
Shoichi Saito, Tokyo, Japan, assignor to Olympus Optical Co., Inc., Tokyo, Japan
Filed Nov. 3, 1966, Ser. No. 591,826
Claims priority, application Japan, Nov. 11, 1965, 40/91,145; Nov. 15, 1965, 40/92,414, 40/92,415
U.S. Cl. 242—55.12 4 Claims
Int. Cl. G11b 15/44

ABSTRACT OF THE DISCLOSURE

In miniature tape recording devices, an improved compact device for driving the tape including a driven counter shaft having rewinding, quick feeding and winding friction wheels mounted thereon, the counter shaft being axially shiftable for selective engagement of the rewinding wheel with the supply reel supporting disc, or either the quick feeding wheel or the winding wheel with the take-up reel supporting disc to frictionally drive the respective disc to effect accurate winding up, quick rewinding or quick feeding of the tape with low power consumption, by avoiding conventional transmitting driving power through the conventional fly wheel during each of the operations.

The present invention relates to a tape recorder and more particularly to a device for driving the tape in a miniature tape recorder capable of effecting accurate winding up, quick rewinding and quick feeding of the tape with low power consumption.

The prior art miniature tape recorders have been constructed in such a manner that the driving power from the motor is transmitted to the fly wheel every time any of the winding up, rewinding and quick feeding of the tape is to be effected, the driving power being transmitted to the shaft supporting the tape reel through intermediate gearing or wheels.

Such a driving system has a disadvantage in that the power consumption of the motor is great because the fly wheel must be driven every time the operation is to be effected. Further, the operating mechanism of the tape recorder of the prior art is very complicated in construction so that the driving mechanism of the tape must necessarily be made in large size.

Therefore, one object of this invention is to provide a miniature tape recorder which avoids the above mentioned disadvantages.

A further object of this invention is to provide a device for driving the tape in a miniature tape recorder which is compact in size and can be operated accurately with low power consumption.

Figure 1:
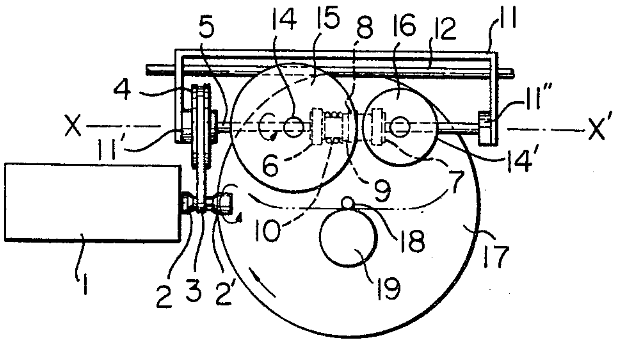
Figure 2:
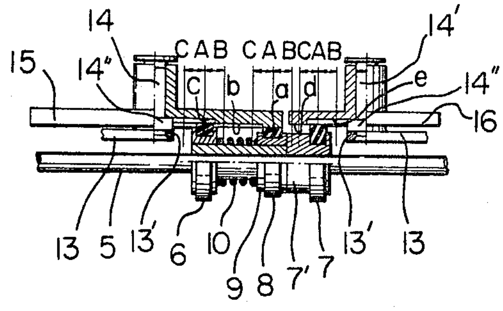

These and other object and advantages of this invention will be more apparent upon reference to the following description, appended claims and accompanying drawings wherein:

FIG. 1 is a plan view of one embodiment of the device for driving the tape in accordance with this invention, FIG. 2 is a cross-sectional view taken along line X–X′ of FIG. 1 showing the switching mechanism in the power transmission system for reel supporting discs.

Figure 3:
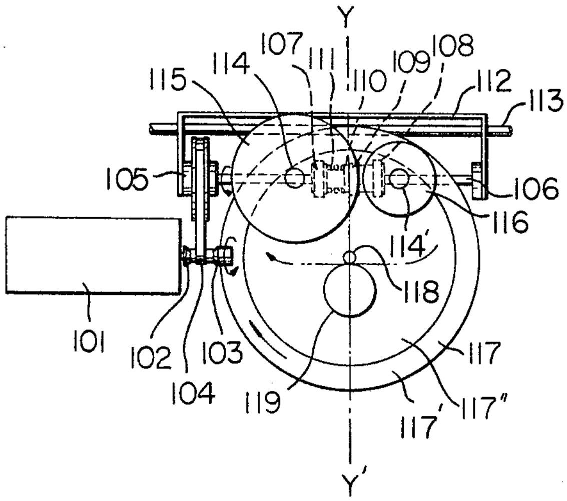
Figure 4:
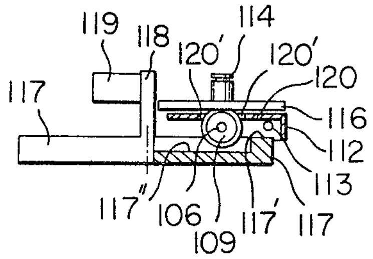
Figure 5:
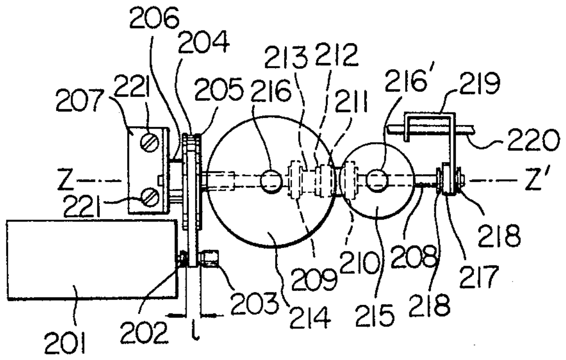
Figure 6:
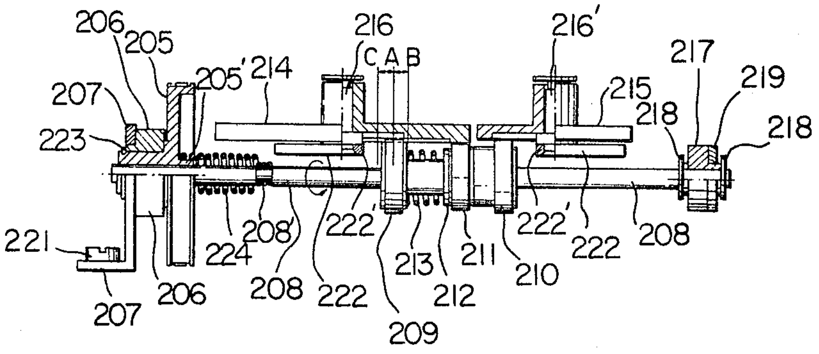

FIG. 3 is a plan view showing the driving system of the tape of modified embodiment of the miniature tape recorder in accordance with this invention, FIG. 4 is a cross-sectional view taken along line Y–Y′ of FIG. 3 showing the relationship of the arrangement between the fly wheel and the driving system for reel supporting discs, FIG. 5 is a plan view showing a further modified embodiment of the device for driving the tape in accordance with this invention, and FIG. 6 is a cross-sectional view taken along line Z–Z′ of FIG. 5 showing the relationship of the arrangement of the switching mechanism of power transmission system for reel supporting discs.

Now referring to FIGS. 1 and 2, motor pulley 2 and friction wheel 2′ are fixedly mounted on the shaft of motor 1, pulley 4 is driven from pulley 2 through resilient belt 3, pulley 4 being fixedly secured to one end of countershaft 5. Friction wheels 6 for quick feeding of the tape and friction wheel 7 for rewinding of the tape are fixedly mounted on the intermediate portion of shaft 5 in spaced apart relationship from each other, friction wheel 8 for winding up of the tape is rotatably mounted on counter shaft 5 between said wheels 6 and 7, said wheel 8 being biased by means of spring 10 against collar 7′ of wheel 7 so as to be frictionally rotated by wheel 7 together with wheel 7, said spring surrounding shaft 5 between wheels 6 and 8 with washer 9 interposed between the end of spring 10 and wheel 8. Counter shaft 5 having thereon said pulley 4 and friction wheels 6, 7 and 8 being journalled in bearings 11′, 11″ fixed to both arm ends of swingable frame 11 in the form of U shape, respectively, said frame 11 being swingably supported by shaft 12 which passes through the arms of frame 11 near the base portion thereof, said frame 11 being also shiftable in the axial direction of shaft 12. Frame 11 is biased by spring means not shown so as to swing said counter shaft 5 upwardly about shaft 12 so that any one of friction wheels will contact with the lower surface of reel supporting discs to drive the discs as described in detail hereinafter. The shifting movement of frame 11 and, hence, counter shaft 5 and friction wheels 6, 7 and 8 supported thereby will effect the switching action of the selective engagement of any of friction wheels 6, 7 and 8 with the lower surface of any one of reel supporting discs 15 and 16 so as to selectively effect winding up, rewinding or quick feeding of the tape as will be described in detail hereinafter. Frame member 13 is provided with supporting shafts 14, 14′ fixedly secured thereto for supporting reels of the tape (not shown) and has an opening 13′ through which portions of friction wheels 6, 7 and 8 can project so that the periphery of any one of wheels 6, 7 and 8 can contact the lower surface of either one of reel supporting discs 15 and 16 as illustrated in FIGS. 2.

Reel supporting disc 15 for winding up the tape is rotatably fitted on supporting shaft 14 and held in position by flange 14″, and reel supporting disc 16 for rewinding the tape is rotatably fitted on supporting shaft 14′ and is held in position by flange 14″. Fly wheel 17 is located below said counter shaft 5 so as to be rotated by the engagement of the upper surface of the periphery of the fly wheel with friction wheel 2′ fixed to the shaft of motor 1. Capstan 18 and pinch roller 19 cooperate to feed the tape sandwiched therebetween for operation of the tape recorder, the tape being wound up onto the reel (not shown) supported on reel supporting disc 15.

As shown in FIG. 2, the relative arrangement and the size and shape of friction wheels 6, 7 and 8 and reel supporting discs 15 and 16 are as follows. The lower surface of reel supporting disc 15 is provided with two circular recesses *b*, *c* which are recessed from outer peripheral lower surface *a*, the depth of recess *c* being greater than recess *b*. When each of friction wheels 6, 7 and 8 is positioned at A position as shown in FIG. 2 and friction wheel 8 which is frictionally driven by wheel 7 by means of spring 10 contacts outer peripheral surface *a* so as to frictionally drive reel supporting disc 15, friction wheel 6 is located in recess *c* without contacting therewith. When counter shaft 5 is moved to the right from the position shown so that each of friction wheels 6, 7 and 8 is positioned at B position as shown in FIG. 2, friction wheel 8 moves out of engagement with outer peripheral surface *a* of reel supporting disc 15 and friction wheel 6 is moved into engagement with recess *b* so that it frictionally drives reel supporting disc 15. The lower surface of reel supporting disc 16 has outer peripheral surface *d* and a recess *e* which is recessed from said surface *d*, the level of said outer peripheral surface *d* being higher than the level of said outer peripheral surface *a* so that friction wheel 8 cannot contact said outer peripheral surface *d* of reel supporting disc 16 when friction wheel 8 moves to the right to be disengaged from said outer peripheral surface *a* of reel supporting disc 15. Further, friction wheel 7 is out of engagement with recess *e* when friction wheels are at A positions. However, when counter shaft 5 is moved to the left so as to position each of friction wheels at C position in the drawing, then friction wheel 7 contacts said outer peripheral surface *d* so that it frictionally drives reel supporting disc 16 and the remaining friction wheels 6 and 8 are disengaged from the lower surface of reel supporting disc 15.

The operation of the tape recorder in accordance with this invention is as follows.

In sound reproducing or recording operation of the tape recorder, counter shaft 5 is positioned at A position and motor pulley 2 and friction wheel 2' coaxial therewith are compressively contacted with the mating surface of fly wheel 17 by the actuation of external operating means not shown, and, at the same time, pinch roller 19 is compressively engaged with capstan 18 with the tape sandwiched therebetween. Thereafter, motor 1 is driven. The tape is fed in the direction of the arrow shown in FIG. 1, and counter shaft 5 is rotated in the direction of the arrow shown in FIG. 1 by means of pulley 2 through resilient belt 3, pulley 4 mounted on shaft 5. As is clear from FIG. 2, in the A position of counter shaft 5, the driving power of motor 1 is transmitted to friction wheel 8 for winding up of the tape through friction wheel 7 for rewinding the tape by virtue of spring 10, and reel supporting disc 15 for carrying the reel for winding up the tape (not shown) is frictionally driven by the engagement of wheel 8 with outer peripheral lower surface *a* of reel supporting disc 15 so that the tape fed out of pinch roller 19 is wound up onto the takeup reel without slackening. Spring 10 serves to accommodate the take up speed of the tape with the feeding speed of pinch roller 19.

In quick feeding of the tape, friction wheel 2' is disengaged from fly wheel 17 and capstan 18 is disengaged from pinch roller 19 by the actuation of external operating means not shown and counter shaft 5 is moved to the right to position each of friction wheels 6, 7 and 8 at B position shown in FIG. 2. Thereafter, motor 1 is driven. Friction wheel 6 for quick feeding of the tape now frictionally drives reel supporting disc 15 by the engagement of wheel 6 with recess *b* of reel supporting disc 15 so that quick winding up of the tape is effected. The remaining wheels 7 and 8 are disengaged from respective reel supporting discs 15 and 16 as is clear from FIG. 2. Since the diameter of wheel 6 is greater than wheel 8 and the point at which wheel 6 engages with reel supporting disc 15 is located at a shorter distance from the center of reel supporting disc 15, it is clear that greater rotating speed of reel supporting disc 15 is achieved.

In the rewinding operation of the tape, friction wheel 2' is disengaged from fly wheel 17 and capstan 18 is disengaged from pinch roller 19 by the actuation of external actuating means not shown as in the case of quick winding of the tape previously mentioned, and counter shaft 5 is moved to the left to position each of friction wheels 6, 7 and 8 at C position shown in FIG. 2. Then friction wheel 7 for rewinding of the tape engages with outer peripheral lower surface *d* of reel supporting disc 16 supporting the reel for rewinding the tape thereon so so as to frictionally drive reel supporting disc 16. The remaining friction wheels 6 and 8 are disengaged from the lower surface of reel supporting disc 15.

A modified embodiment of this invention is illustrated in FIGS. 3 and 4. The device shown in FIGS. 3 and 4 is similar to that shown in FIGS. 1 and 2 except that fly wheel 117 is provided with recess 117'' on the upper surface thereof with outer peripheral upper surface 117' being left for engagement with friction wheel 103 fixed to the shaft of driving motor 101. The description of the other mechanism of this device similar to that shown in FIGS. 1 and 2 is not necessary as shown in FIGS. 3 and 4, portions of friction wheels 107, 108 and 109 similar in construction and actuation thereof to friction wheels 6, 7 and 8 shown in FIGS. 1 and 2 are brought into recess 117'' but do not contact recess 117'', counter shaft 106 similar in construction and actuation thereof to shaft 5 shown in FIGS. 1 and 2 being permitted to be located as close as possible to outer peripheral upper surface 117' of fly wheel 117 without contacting therewith. This permits the thickness of the device to be substantially reduced, a very important factor in a miniature tape recorder. The diameter of recess 117'' is selected, of course, to permit friction wheels 107, 108 and 109 to be shifted for effecting switching action of the operation of the tape recorder.

The fly wheel effect EK is generally expressed by the following formula:

$$EK=\frac{W^2}{2g}Zmr^2$$

wherein $W$=angular velocity of fly wheel,
$m$=mass of each point in fly wheel,
$r$=radial position of said mass from the center of fly wheel.

The provision of recess 117'' in fly wheel 117 does not affect significant reduction in fly wheel effect, because recess 117'' is of smaller diameter.

The operation of the device shown in FIGS. 3 and 4 is similar to that shown in FIGS. 1 and 2.

A further modification of this invention is shown in FIGS. 5 and 6. The device shown in FIGS. 5 and 6 is generally the same in construction as that shown in FIGS. 1 and 2 except that pulley 205 which is driven by pulley 202 fixed to the shaft of motor 201 through resilient belt 204 does not shift even when counter shaft 208 is shifted axially for effecting switching action of the operation of the tape recorder thereby positively preventing belt 204 from being disengaged from pulley 205 which might occur when pulley 205 should otherwise be shifted together with counter shaft 208.

Referring to FIGS. 5 and 6, pulley 202 and friction wheel 203 coaxial therewith are fixedly secured on the shaft of motor 201, resilient belt 204 transmitting driving power from motor 201 from pulley 202 to pulley 205. Bearing 206 rotatably but non-shiftably supports pulley 205, said bearing 206 being fixed to fixing member 207 which, in turn, is fixed to the base member not shown by means of bolts 221. Ring 223 serves as means for preventing the axial shifting of pulley 205 rotative to bearing 206. Counter shaft 208 is shiftably journaled in the boss of pulley 205. *l* designates the thickness of pulley 202. Friction wheel 209 for quick feeding of the tape and friction wheel 210 for rewinding the tape are fixedly secured on counter shaft 208 at intermediate points, thereof in spaced apart relationship, and friction wheel 211 for winding up of the tape is slidably interposed between said two friction wheels 209 and 210, and washer 212 and spring 213 urge friction wheel 211 against friction wheel 210 so that friction wheel 211 is frictionally driven by the engagement thereof with friction wheel 210 so as to be rotated together with wheel 210, the arrangement of friction wheels being similar to that shown in FIGS. 1 and 2. Reel supporting disc 214 for winding up of the tape and reel supporting disc 215 for rewinding the tape are rotatably supported on supporting shafts 216, 216', respectively, which are fixedly secured to frame member 222 having an opening 222' therein through which portions of friction wheels 209, 210 and 211 project so as to selectively engage with the lower surfaces of reel supporting discs 214 and 215, the arrangement being similar to that shown in FIGS. 1 and 2. The other end of counter shaft 208 opposite to the end which is journaled in pulley 205 is rotatably supported by bearing 217 which is secured to the outer end of arm of frame 219 which, in turn, is swingably supported by shaft 220 passing through frame 219. Rings 218 secured on the end of counter shaft 208 prevent the shaft 208 from disengaging from bearing 217. Frame 219 is urged upwardly by a spring not shown so as to assure the engagement of any of friction wheels 209, 210 and 211 with the lower surface of either of reel supporting discs 214 and 215. Frame 219 can be shifted in the axial direction of shaft 220 as in the case of the device shown in FIGS. 1 and 2 so as to effect selective engagement of friction wheels 209, 210, 211 with the lower surface of either of reel supporting discs 214, 215. Pulley 205 is provided with a boss 205' at the side opposite to bearing 206, and a reduced portion 208' is provided on counter shaft 208 at a position intermediate said boss 205' and friction wheel 209. A closely wound helical spring 224 is provided which surrounds countershaft 208, one end of said spring 224 being fixed to said boss 205' while the other end of said spring 224 is provided with reduced portion so as to secure said other end to said reduced portion 208' of counter shaft 208 so that pulley 205 can transmit the driving power from motor 201 to counter shaft 208 through spring 224. Spring 224 permits relative shifting movement between pulley 205 and counter shaft 208 while it positively transmits driving power from pulley to counter shaft 208. When counter shaft 208 is driven in the direction shown by the arrow in the drawing, leftwardly coiled spring 224 is preferably used so as to avoid excess slippage between mating members.

When swingable frame 219 is shifted by external actuating means not shown in the axial direction of shaft 220 so as to selectively engage any one of frictional wheels 209, 210 and 211 with either of reel supporting discs 214 and 215 as in the case of the device shown in FIGS. 1 and 2, the operation of the tape recorder can be switched to any one of sound reproducing or recording operation (friction wheel 209 for quick feeding being located at A position in FIG. 6), quick feeding operation (friction wheel 209 being located at B position) and rewinding operation (friction wheel 209 being located at C position). In this switching operation pulley 205 does not shift axially, and spring 224 accommodates the relative movement of counter shaft to pulley thereby assuring positive power transmission from pulley 205 to counter shaft 208. With this arrangement, the length *l* of pulley 202 can be made very short, in comparison with the case in which pulley and counter shaft are rigidly fixed to each other, while the driving power is safely and positively transmitted to counter shaft 208 from pulley 202 through pulley 205. This arrangement makes it possible to produce a highly accurate pulley easily and inexpensively.

As described above, the device for driving the tape in accordance with this invention permits the desired switching operation to be effected very easily by merely shifting the counter shaft axially so as to selectively engage any one of friction wheels to either of reel supporting discs. The device for driving the tape is very simple in construction thereby enabling the device to be constructed in very compact size. Further, since the fly wheel is not driven in quick feeding and rewinding operation of the tape, the starting of the operation can be quickly effected and power consumption is greatly reduced. Further, the life of the motor is increased and the wear of frictionally engaging members is reduced, thereby assuring accurate running of the tape recorder.

What I claim is:

1. Device for driving the tape in a miniature recorder comprising a frame including an inverted U-shaped shiftable support, a counter shaft journaled in said support, a rotatable take-up reel-supporting disc and a rotatable supply reel-supporting disc respectively mounted for rotation on said frame, a quick feeding friction wheel, a winding friction wheel and a rewinding friction wheel each mounted on said countershaft for rotation therewith, means for driving said countershaft, means mounting said support and countershaft for selective axial shiftable movement relative to said discs to frictionally drive a selected disc, means on said take-up reel-supporting disc engaging said quick feeding friction wheel upon axial movement of said support and counter shaft to a quick feeding position, means on said take-up reel-supporting disc engaging said winding friction wheel upon axial movement of said support and countershaft to a recording or reproducing position, and means on said supply reel-supporting disc engaging said rewinding friction wheel upon axial movement of said support and counter shaft to a rewind position, thereby permitting a choice of quick feeding of the tape, winding of the tape for sound recording or sound reproducing operation and rewinding of the tape to be selectively effected by the said axial shifting movement of said counter shaft.

2. Device for driving the tape in a miniature tape recorder having capstan means and pinch roller means for feeding the tape for sound recording or sound reproducing operation, said device comprising a drive motor, a motor pulley and a motor friction wheel coaxially fixed to the shaft of said drive motor, a fly wheel located below said motor friction wheel and adapted to be selectively driven by said motor friction wheel about an axis transverse to the axis of said drive motor, a driven pulley driven by said motor pulley through a belt stretched over said motor pulley and said driven pulley, a counter shaft carrying said driven pulley at one end thereof and driven thereby for rotation, a quick feeding friction wheel fixedly mounted on said counter shaft at an intermediate portion thereof, a rewinding friction wheel fixedly mounted on said counter shaft spaced apart from said quick feeding friction wheel, a winding friction wheel rotatably and shiftably mounted on said counter shaft between said quick feeding and rewinding friction wheel and biased against said rewinding wheel by means of spring means for frictional rotation with said rewinding wheel, a swingable frame rotatably carrying said counter shaft with said driven pulley and said friction wheels mounted thereon and, upon actuation by external means, capable of shifting said counter shaft axially, a first reel supporting disc supported on said recorder above said counter shaft and rotatable about an axis transverse to the axis of said counter shaft, said first disc being adapted to support a take-up reel thereon for rotation thereof with said disc, a second reel supporting disc located substantially on the same level as said first disc and supported on said recorder adjacent to said first disc and rotatable about an axis parallel to said axis of said first disc, said second disc being adapted to support supply or rewinding reel thereon for rotation thereof with said second disc, said swingable lever being biased so as to urge said friction wheels mounted on said counter shaft in selective frictional engagement with said first and second discs, the lower surface of said first disc being provided with a first flat bottomed recess coaxial with the axis of said first disc and recessed from the outer peripheral lower surface of said first disc and a second flat bottomed recess of smaller diameter than said first recess coaxially recessed from said first recess, the lower surface of said second disc being provided with a flat bottomed recess coaxial with the axis of said second disc and recessed from the outer peripheral lower surface of said second disc, each of said quick feeding, winding and rewinding friction wheels being arranged and actuated to be selectively engaged respectively with said first recess, said outer peripheral lower surface of said first disc and said outer peripheral lower surface of said second disc by said shifting movement of said counter shaft so as to frictionally drive either of said first and second discs in such a manner that, in a first axial position of said counter shaft, only said winding friction wheel frictionally engages with said outer peripheral lower surface of said first disc for effecting winding operation of the tape onto the reel supported on said first disc while said capstan, pinch roller and fly wheel are actuated for effecting sound reproducing or recording operation, said spring which urges said winding friction wheel against said rewinding friction wheel serving as means for accommodating the feeding speed of the tape by said winding wheel with the feeding speed of the tape by said capstan and pinch rollers, and, in a second axial position of said counter shaft shifted from said first position, only said quick feeding friction wheel frictionally engages with said first recess of said first disc thereby effecting quick feeding of the tape onto the take-up reel while said pinch roller and fly wheel are in inoperative position, and, in a third axial position shifted in the opposite direction to said second position from said first position, only said rewinding friction wheel frictionally engages with said outer peripheral lower surface of said second disc thereby effecting rewinding of the tape onto the reel supported on said second disc while said pinch roller and fly wheel are in inoperative position.

3. Device in accordance with claim 2, wherein said fly wheel is provided with a recess in the upper surface thereof, said recess being adapted to receive therein a portion of each of said friction wheels allowing the shifting movement of said counter shaft for effecting the switching of the operation of the recorder, thereby permitting the height of the device to be reduced to the minimum.

4. Device in accordance with claim 2, wherein said driven pulley is axially slidably mounted on said counter shaft so that said pulley remains in the fixed axial position despite the axial shifting movement of said counter shaft, means being provided to transmit the rotating force from said driven pulley to said counter shaft regardless of the relative axial movement therebetween.

References Cited

UNITED STATES PATENTS 3,130,934 4/1964 Richt et al. -------- 242—55.12

GEORGE F. MAUTZ, *Primary Examiner.*